(12) United States Patent
Baker

(10) Patent No.: US 10,443,539 B2
(45) Date of Patent: Oct. 15, 2019

(54) HYBRID EXHAUST NOZZLE

(71) Applicant: Rolls-Royce North American Technologies, Inc., Indianapolis, IN (US)

(72) Inventor: Von D. Baker, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 1050 days.

(21) Appl. No.: 14/949,315

(22) Filed: Nov. 23, 2015

(65) Prior Publication Data

US 2017/0145955 A1    May 25, 2017

(51) Int. Cl.
  F02K 1/12    (2006.01)
  B64D 33/04   (2006.01)
  F02K 3/077   (2006.01)

(52) U.S. Cl.
  CPC .............. F02K 1/12 (2013.01); B64D 33/04 (2013.01); F02K 1/1276 (2013.01); F02K 3/077 (2013.01); F05D 2250/10 (2013.01); F05D 2250/13 (2013.01); Y02T 50/671 (2013.01)

(58) Field of Classification Search
  CPC ... B64D 33/04; F02K 1/06; F02K 1/12; F02K 3/077; F05D 2250/10; F05D 2250/13
  See application file for complete search history.

(56) References Cited

U.S. PATENT DOCUMENTS

| | | | |
|---|---|---|---|
| 3,038,304 A * | 6/1962 | Alford | F02K 1/1269 239/265.41 |
| 3,163,000 A * | 12/1964 | Kerridge | F02K 1/1223 60/242 |
| 3,863,867 A * | 2/1975 | Souslin | B64D 33/04 239/265.19 |
| 4,080,785 A * | 3/1978 | Koff | F02K 3/075 415/69 |
| 6,962,044 B1 | 11/2005 | Miller et al. | |
| 7,174,704 B2 | 2/2007 | Renggli | |
| 7,216,475 B2 | 5/2007 | Johnson | |
| 7,814,753 B2 | 10/2010 | Farah et al. | |
| 8,739,548 B2 | 6/2014 | Petty | |
| 2012/0167549 A1 | 7/2012 | Lariviere et al. | |
| 2014/0165575 A1* | 6/2014 | Izquierdo | F02K 1/1207 60/772 |
| 2015/0121889 A1* | 5/2015 | Baker | F02K 1/1215 60/772 |

* cited by examiner

*Primary Examiner* — Lorne E Meade

(74) *Attorney, Agent, or Firm* — Barnes & Thornburg LLP

(57) ABSTRACT

An exhaust system or nozzle for use in a gas turbine engine is disclosed herein. The exhaust system is adapted to adjust various streams of pressurized air produced by the gas turbine engine to control operation of the gas turbine engine.

24 Claims, 7 Drawing Sheets

HYBRID EXHAUST NOZZLE

FIELD OF THE DISCLOSURE

The present disclosure relates generally to gas turbine engines, and more specifically to exhaust systems for gas turbine engines.

BACKGROUND

Gas turbine engines used in some aircraft include exhaust systems that have variable area exhaust nozzles. Variable area exhaust nozzles may include flaps that are movable to vary the area of the exhaust nozzles. Those exhaust nozzles, however, may present a number of drawbacks. Alternative variable area exhaust nozzles for gas turbine engines therefore remain an area of interest.

SUMMARY

The present disclosure may comprise one or more of the following features and combinations thereof.

The present disclosure is applicable to advanced turbofan engines adapted for use in multi-mission fighter and/or bomber aircraft wherein the exhaust nozzle exit aperture is of fixed geometry. Features of the present disclosure may enhance nozzle aerodynamic and structural integration with overall aircraft system design, may improve nozzle thrust-minus-drag performance and air vehicle survivability, and may reduce aircraft weight and cost.

According to one aspect of the present disclosure, a gas turbine engine includes an engine core, a fan, and an exhaust system. The engine core is configured to discharge a first stream of pressurized air that is passed through the engine core along a central axis. The fan is coupled to the engine core to be driven by the engine core and configured to discharge a second stream of pressurized air and a third stream of pressurized air that are passed around the engine core. The exhaust system illustratively consists of an axisymmetric (axi) convergent section and a two-dimensional (2-D) divergent section. The axi design convergent section may be common to various engine nozzle designs and may be scaled to different engine thrust sizes. The 2-D design is installation specific for optimum survivability, minimum weight, and cost.

In some embodiments, the exhaust system is coupled to the engine core and the exhaust system includes an inner axisymmetric duct, an outer co-annular duct, a plurality of aft adjustment flaps, and a plurality of forward adjustment flaps. The inner duct is arranged around the central axis to define an inner passageway arranged to receive the first stream and the second stream of pressurized air. The outer duct is arranged radially outward of the inner duct around the central axis so that the inner duct and the outer duct cooperate to define an outer passageway arranged to receive the third stream of pressurized air. The aft adjustment flaps are mounted to pivot relative to the inner duct. Each of the aft adjustment flaps has an inner portion extending radially inward from the inner duct toward the central axis and an outer portion extending radially outward from the inner duct away from the central axis. Each of the forward adjustment flaps has an aft end pivotally coupled to the outer portion of a corresponding aft adjustment flap and a forward end mounted to the inner duct to slide relative to the inner duct.

In some embodiments, the aft adjustment flaps may be mounted to pivot relative to the inner duct between a constricted position in which the aft adjustment flaps close down a first throat area position defined between the outer portions of the aft adjustment flaps and the outer duct to restrict the third stream of pressurized air from passing through the outer passageway and an unconstricted position in which the aft adjustment flaps open the first throat to allow the third stream of pressurized air to pass more freely through the outer passageway, the aft adjustment flaps may close down a second throat area position defined between the inner portions of the aft adjustment flaps to restrict the first and second streams of pressurized air from passing through the inner passageway when the aft adjustment flaps are in the constricted position, and the aft adjustment flaps may open the second throat to allow the first and second streams of pressurized air to pass more freely through the inner passageway when the aft adjustment flaps are in the unconstricted position. In some embodiments, a first angle may be defined between the inner duct and the outer portions of the aft adjustment flaps when the aft adjustment flaps are in the constricted position and a second angle may be defined between the inner duct and the outer portions of the aft adjustment flaps when the aft adjustment flaps are in the unconstricted position that is less than the first angle. Additionally, in some embodiments, movement of the aft adjustment flaps between the constricted position and the unconstricted position may cause the forward ends of the forward adjustment flaps to slide relative to the inner duct between an aft position along the central axis and a forward position along the central axis that is forward of the aft position.

In some embodiments, the exhaust system may further include a divergent section coupled to the outer duct and arranged to extend away from the outer duct toward the central axis and a plurality of divergent flaps coupled to the divergent section so that the divergent flaps extend aft of the inner portions of the aft adjustment flaps away from the central axis, and the inner portions of the aft adjustment flaps and the divergent flaps may cooperate to define a third throat that is positioned aft of the first throat along the central axis. Movement of the aft adjustment flaps to the unconstricted position may close down the third throat to restrict the third stream of pressurized air from passing to the divergent section, and movement of the aft adjustment flaps to the constricted position may open the third throat to allow the third stream of pressurized air to pass more freely to the divergent section. The divergent flaps may be mounted to pivot relative to the divergent section between a constricted position in which the divergent flaps close down the third throat to restrict the third stream of pressurized air from passing to the divergent section and an unconstricted position in which the divergent flaps open the third throat to allow the third stream of pressurized air to pass more freely to the divergent section.

In some embodiments, the outer duct may terminate at an outer duct outlet having a substantially circular cross section, and the divergent section may include a divergent section inlet fluidly coupled to the outer duct outlet that has a first substantially quadrilateral cross section. The divergent section may terminate at a exit area positioned aft of the divergent section inlet along the central axis that has a second substantially quadrilateral cross section different from the first substantially quadrilateral cross section. The outer and inner ducts may be shaped to conduct the first, second, and third streams of pressurized air substantially axisymmetrically relative to the central axis to the divergent section inlet, and the divergent section may be shaped to conduct the first, second, and third streams of pressurized air substantially two-dimensionally relative to the central axis from the divergent section inlet to the exit area.

According to another aspect of the present disclosure, an exhaust system for a gas turbine engine includes an inner duct, an outer duct, a plurality of aft adjustment flaps, and a plurality of forward adjustment flaps. The inner duct is arranged around a central axis of the gas turbine engine, and the inner duct defines an inner passageway arranged to receive a first stream of pressurized air discharged from an engine core of the gas turbine engine and a second stream of pressurized air discharged from a fan of the gas turbine engine and passed around the engine core. The outer duct is arranged radially outward of the inner duct around the central axis of the gas turbine engine, and the outer duct cooperates with the inner duct to define an outer passageway arranged to receive a third stream of pressurized air discharged from the fan of the gas turbine engine and passed around the engine core. The aft adjustment flaps are mounted to pivot relative to the inner duct, and each of the aft adjustment flaps has an inner portion extending radially inward from the inner duct toward the central axis and an outer portion extending radially outward from the inner duct away from the central axis. The forward adjustment flaps are positioned forward of the aft adjustment flaps along the central axis, and each of the forward adjustment flaps has an aft end pivotally coupled to the outer portion of a corresponding aft adjustment flap and a forward end mounted to the inner duct to slide relative to the inner duct.

In some embodiments, the exhaust system may include a divergent section coupled to the outer duct and arranged to extend away from the outer duct toward the central axis and a plurality of divergent flaps coupled to the divergent section so that the divergent flaps extend aft of the inner portions of the aft adjustment flaps away from the central axis, the inner portions of the aft adjustment flaps and the divergent flaps may cooperate to define a first throat arranged to receive the third stream of pressurized air, and the inner portions of the aft adjustment flaps may define a second throat arranged to receive the first and second streams of pressurized air. The divergent flaps may be mounted to pivot relative to the divergent section between a constricted position in which the divergent flaps close down the first throat to restrict the third stream of pressurized air from passing to the divergent section and an unconstricted position in which the divergent flaps open the first throat to allow the third stream of pressurized air to pass more freely to the divergent section.

In some embodiments, the outer duct may terminate at an outer duct outlet having a substantially circular cross section, and the divergent section may include a divergent section inlet fluidly coupled to the outer duct outlet that has a first substantially quadrilateral cross section. The divergent section may terminate at a exit area positioned aft of the divergent section inlet along the central axis that has a second substantially quadrilateral cross section different from the first substantially quadrilateral cross section. The outer and inner ducts may be shaped to conduct the first, second, and third streams of pressurized air substantially axisymmetrically relative to the central axis to the divergent section inlet, and the divergent section may be shaped to conduct the first, second, and third streams of pressurized air substantially two-dimensionally relative to the central axis from the divergent section inlet to the exit area.

In some embodiments, the aft adjustment flaps may be mounted to pivot relative to the inner duct between a constricted position in which the aft adjustment flaps close down a third throat defined between the outer portions of the aft adjustment flaps and the outer duct and positioned forward of the first throat along the central axis to restrict the third stream of pressurized air from passing through the outer passageway and an unconstricted position in which the aft adjustment flaps open the third throat to allow the third stream of pressurized air to pass more freely through the outer passageway, the aft adjustment flaps may close down the second throat to restrict the first and second streams of pressurized air from passing through the inner passageway when the aft adjustment flaps are in the constricted position, and the aft adjustment flaps may open the second throat to allow the first and second streams of pressurized air to pass more freely through the inner passageway when the aft adjustment flaps are in the unconstricted position. A first angle may be defined between the inner duct and the outer portions of the aft adjustment flaps when the aft adjustment flaps are in the constricted position, and a second angle may be defined between the inner duct and the outer portions of the aft adjustment flaps when the aft adjustment flaps are in the unconstricted position that is less than the first angle. Additionally, in some embodiments, movement of the aft adjustment flaps between the constricted position and the unconstricted position may cause the forward ends of the forward adjustment flaps to slide relative to the inner duct between an aft position along the central axis and a forward position along the central axis that is forward of the aft position. Additionally, in some embodiments still, movement of the aft adjustment flaps between the constricted position and the unconstricted position may cause the forward ends of the forward adjustment flaps to slide relative to the inner duct between an aft position along the central axis and a forward position along the central axis that is forward of the aft position.

According to yet another aspect of the present disclosure, an aircraft includes an airframe, a nacelle, and a gas turbine engine. The nacelle is supported by the airframe. The gas turbine engine is supported by the airframe and surrounded at least partially by the nacelle. The gas turbine engine includes an engine core, a fan, and an exhaust system. The engine core is configured to discharge a first stream of pressurized air that is passed through the engine core along a central axis. The fan is coupled to the engine core to be driven by the engine core and configured to discharge a second stream of pressurized air and a third stream of pressurized air that are passed around the engine core. The exhaust system is coupled to the engine core and the exhaust system includes an inner duct, an outer duct, a plurality of aft adjustment flaps, and a plurality of forward adjustment flaps. The inner duct is arranged around the central axis to define an inner passageway arranged to receive the first stream and the second stream of pressurized air. The outer duct is arranged radially outward of the inner duct around the central axis so that the inner duct and the outer duct cooperate to define an outer passageway arranged to receive the third stream of pressurized air. The aft adjustment flaps are mounted to pivot relative to the inner duct. Each of the aft adjustment flaps has an inner portion extending radially inward from the inner duct toward the central axis and an outer portion extending radially outward from the inner duct away from the central axis. Each of the forward adjustment flaps has an aft end pivotally coupled to the outer portion of a corresponding aft adjustment flap and a forward end mounted to the inner duct to slide relative to the inner duct.

In some embodiments, the aircraft may further include a flexible seal, the exhaust system may further include a divergent section coupled to the outer duct and arranged to extend away from the outer duct toward the central axis, and the divergent section may be configured to be mounted to the airframe with the flexible seal. The divergent section may interface with the nacelle to form a smooth contour.

These and other features of the present disclosure will become more apparent from the following description of the illustrative embodiments.

DETAILED DESCRIPTION OF THE DRAWINGS

Figure 1:
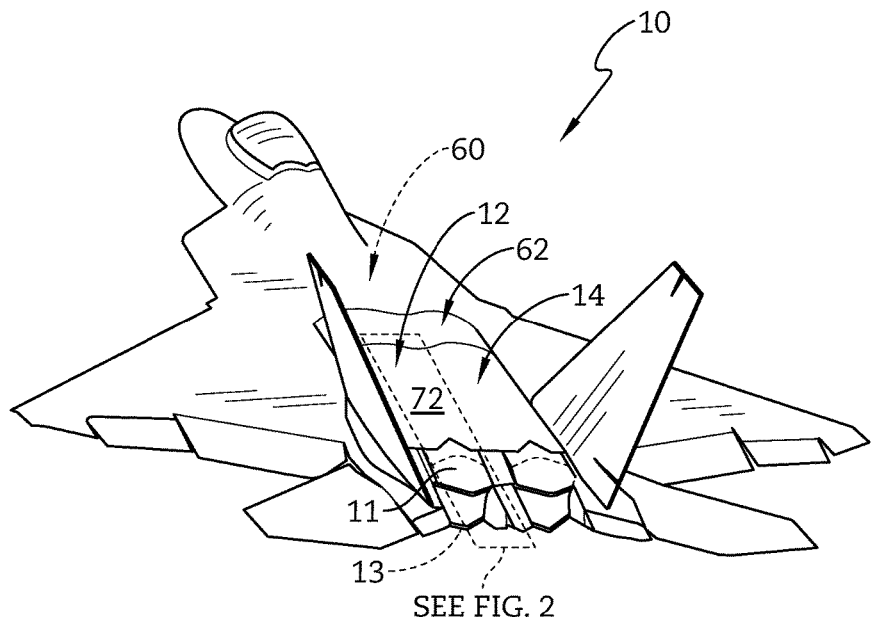
FIG. 1 is a perspective view of an aircraft that includes a pair of gas turbine engines.

For the purposes of promoting an understanding of the principles of the disclosure, reference will now be made to a number of illustrative embodiments illustrated in the drawings and specific language will be used to describe the same.

Referring now to FIG. 1, an illustrative aircraft 10 is shown that includes a pair of gas turbine engines 12, 14. The gas turbine engines 12, 14 are substantially identical to one another, and as such, only the gas turbine engine 12 is described in greater detail below.

Figure 2:
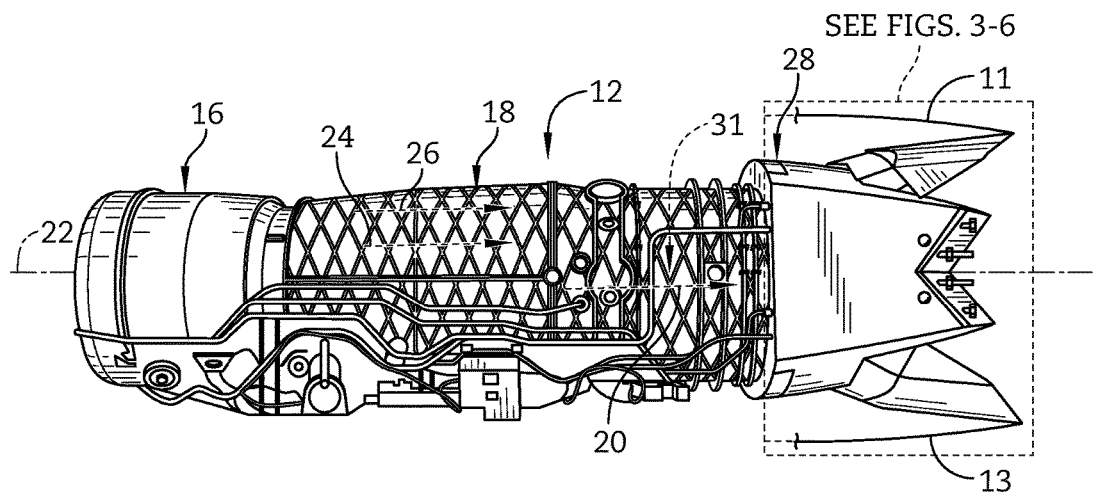
FIG. 2 is a side elevation view of one of the gas turbine engines of FIG. 1 showing that the gas turbine engine includes an engine core, a fan coupled to the engine core, and an exhaust system coupled to the engine core and adapted to adjust various flow streams passed downstream of the engine core.

Referring now to FIG. 2, the gas turbine engine 12 illustratively includes a fan 16 and an engine core 18. The engine core 18 is configured to discharge a first stream of pressurized air 20 that is passed through the engine core 18 along a central axis 22. The fan 16 is coupled to the engine core 18 to be driven by the engine core 18, and the fan 16 is configured to discharge a second stream of pressurized air 24 and a third stream of pressurized air 26 that are passed around the engine core 18.

The gas turbine engine 12 further includes an exhaust system (or nozzle) 28 as shown in FIG. 2. The exhaust system 28 is configured to adjust the flows of the first, second, and third streams of pressurized air 20, 24, 26 as they are discharged from the engine core 18 and the fan 16.

By adjusting the streams of pressurized air, the exhaust system 28 can contribute to performance control of the gas turbine engine 12. Particularly, the exhaust system 28 can be set to a high-power acceleration mode as shown in FIG. 3 or a low-power cruise mode as shown in FIG. 4.

Figure 3:
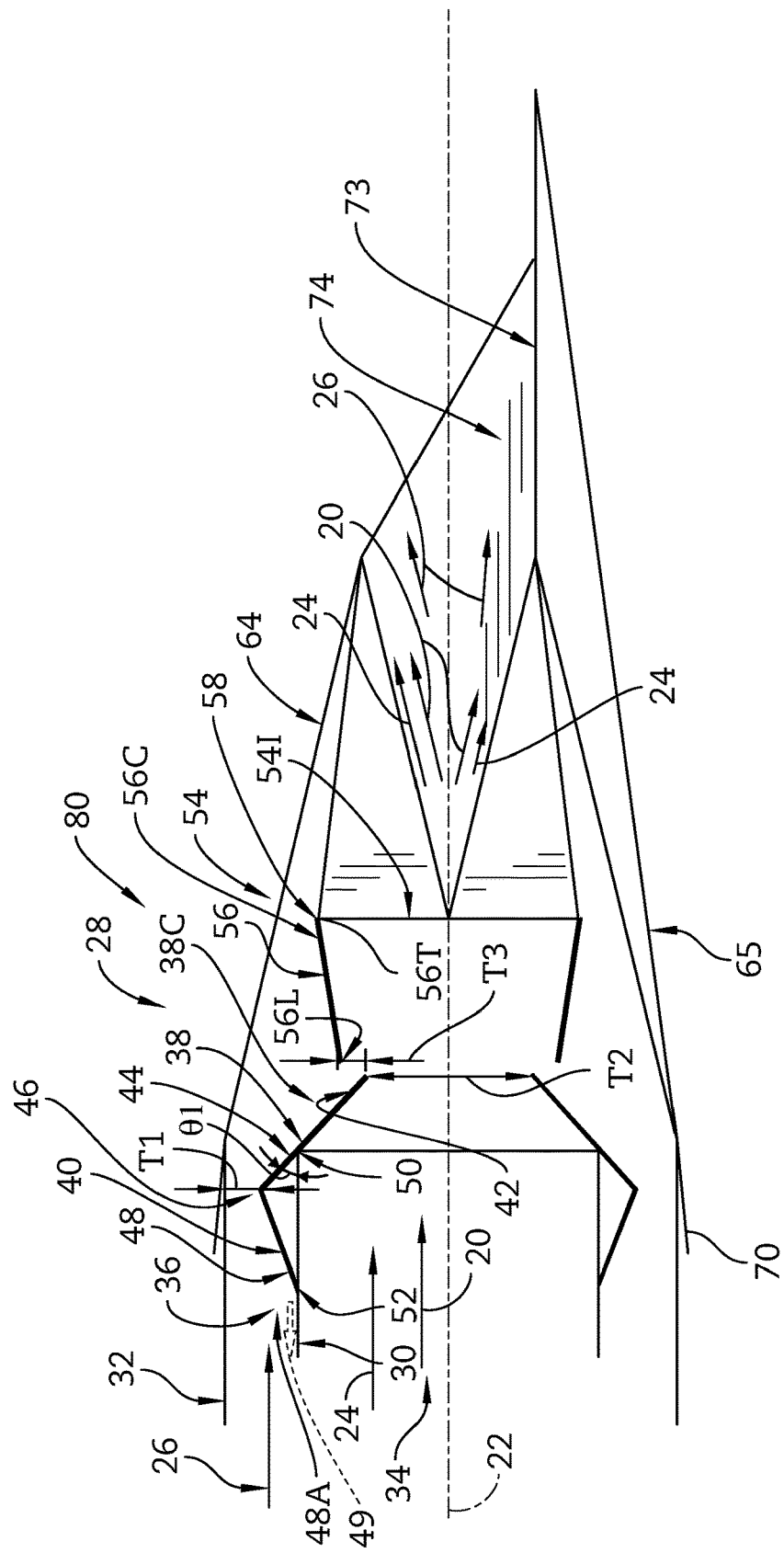
FIG. 3 is a side cross-sectional view of the exhaust system of FIG. 2 showing forward adjustment flaps, aft adjustment flaps, and divergent flaps at one operating point of the gas turbine engine.
Figure 4:
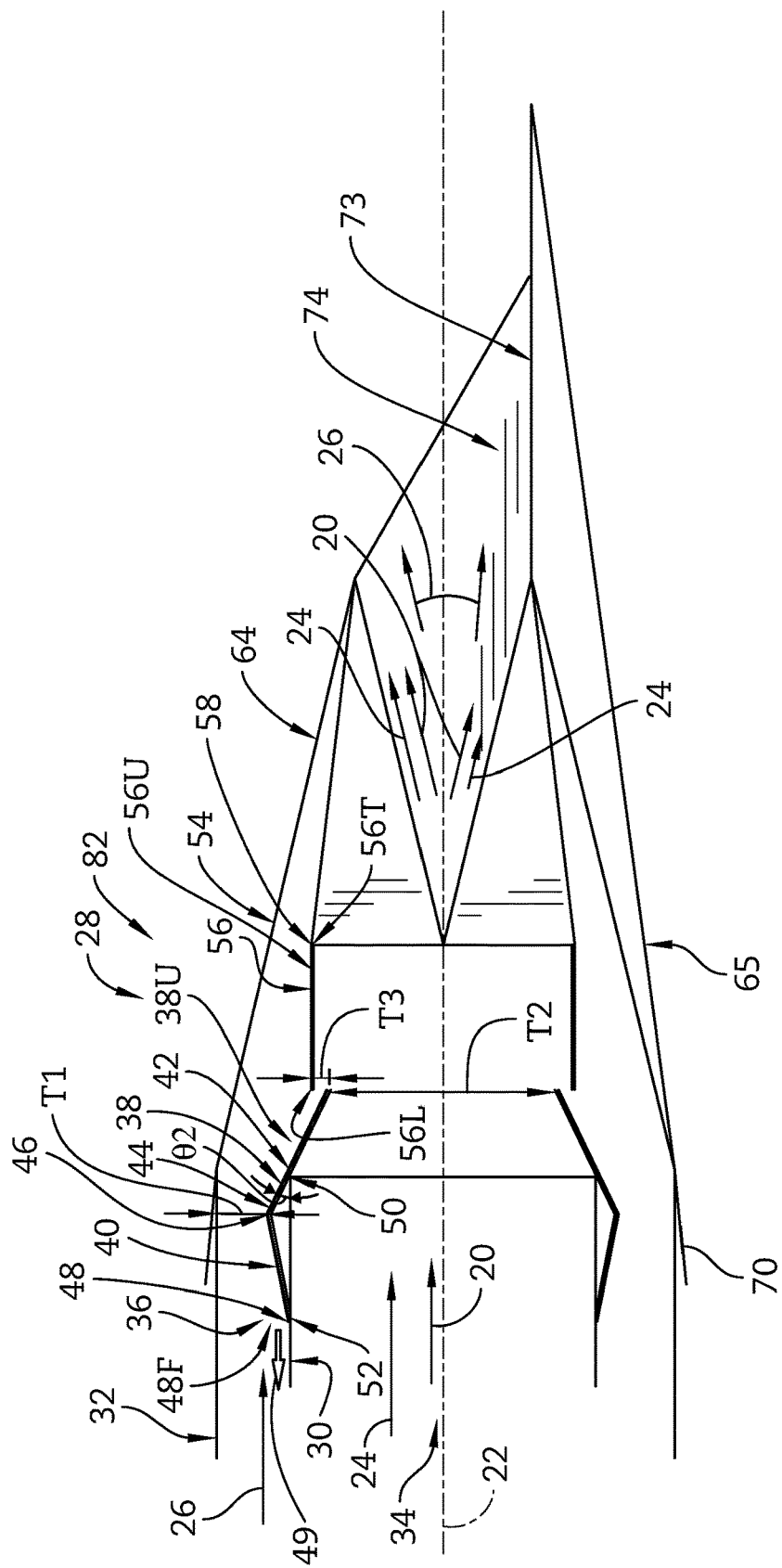
FIG. 4 is a side cross-sectional view similar to FIG. 3 showing the forward adjustment flaps, the aft adjustment flaps, and the divergent flaps at another operating point of the gas turbine engine.

The exhaust system 28 is coupled to the engine core 18, and the exhaust system 28 includes an inner duct 30 and an outer duct 32 as shown in FIGS. 3 and 4. The inner duct 30 is arranged around the central axis 22 to define an inner passageway 34 that is arranged to receive the first and second streams of pressurized air 20, 24. The outer duct 32 is arranged radially outward of the inner duct 30 around the central axis 22 so that the inner and outer ducts 30, 32 cooperate to define an outer passageway 36 that is arranged to receive the third stream of pressurized air 26.

The exhaust system 28 further illustratively includes a plurality of aft adjustment flaps 38 and a plurality of forward adjustment flaps 40 as shown in FIGS. 3 and 4. The aft adjustment flaps 38 are mounted to pivot relative to the inner duct 30. Each of the aft adjustment flaps 38 has an inner portion 42 that extends radially inward from the inner duct 30 toward the central axis 22 and an outer portion 44 that extends radially outward from the inner duct 30 away from the central axis 22. The forward adjustment flaps 40 are positioned forward of the aft adjustment flaps 38 along the central axis 22. Each of the forward adjustment flaps 40 has an aft end 46 that is pivotally coupled to the outer portion 44 of the corresponding aft adjustment flap 38 and a forward end 48 that is mounted to the inner duct 30 to slide relative to the inner duct 30.

In the illustrative embodiment, the first and second streams of pressurized air 20, 24 are passed to the inner duct 30 through an afterburner 31 arranged between the engine core 18 and the exhaust system 28 along the central axis 22 as best seen in FIG. 2. The afterburner 31 is configured to provide thrust in addition to the thrust provided by the engine core 18. The first and second streams of pressurized air 20, 24 are mixed with fuel, ignited, and discharged thereafter by the afterburner 31 to provide the additional thrust.

In the illustrative embodiment, the aft adjustment flaps 38 are mounted to pivot relative to the inner duct 30 between a constricted position 38C shown in FIG. 3 and an unconstricted position 38U shown in FIG. 4. In the constricted position 38C, the aft adjustment flaps 38 close down a throat T1 defined between the outer portions 44 of the flaps 38 and the outer duct 32 to restrict the third stream of pressurized air 26 from passing through the outer passageway 36. In the unconstricted position 38U, the aft adjustment flaps 38 open the throat T1 to allow the third stream of pressurized air 26 to pass more freely through the outer passageway 36.

The exhaust system 28 illustratively includes aft-adjustment-flap actuators 50 and forward-adjustment-flap actuators 52 as shown in FIGS. 3 and 4. One aft-adjustment-flap actuator 50 is coupled to each of the aft adjustment flaps 38 to pivot each of the flaps 38 relative to the inner duct 30. One forward-adjustment-flap actuator 52 is coupled to each of the forward adjustment flaps 40 to slide the forward end 48 of each of the flaps 40 relative to the inner duct 30. In one example, the actuators 50, 52 may be embodied as, or otherwise include, hydraulically-operated actuators such as hydraulic pistons. In another example, the actuators 50, 52 may be embodied as, or otherwise include, electrically-powered actuators such as electrically-powered linear actuators.

Movement of the aft adjustment flaps 38 between the constricted position 38C and the unconstricted position 38U as shown in FIGS. 3 and 4 illustratively adjusts a throat T2 defined between the inner portions 42 of the aft adjustment flaps 38. The throat T2 is located aft and radially inward of the throat T1 relative to the central axis 22. When the aft adjustment flaps 38 are in the constricted position 38C, the flaps 38 close down the throat T2 to restrict the first and second streams of pressurized air 20, 24 from passing through the inner passageway 34. When the aft adjustment flaps 38 are in the unconstricted position 38U, the flaps 38 open the throat T2 to allow the first and second streams of pressurized air 20, 24 to pass more freely through the inner passageway 34.

When the aft adjustment flaps 38 are in the constricted position 38C shown in FIG. 3, an angle $\Theta 1$ is defined between the inner duct 30 and each of the outer portions 44 of the aft adjustment flaps 38. When the aft adjustment flaps 38 are in the unconstricted position 38U shown in FIG. 4, an angle $\Theta 2$ is defined between the inner duct 30 and each of the outer portions 44 of the aft adjustment flaps 38. The angle $\Theta 2$ is illustratively less than the angle $\Theta 1$.

Movement of the aft adjustment flaps 38 between the constricted position 38C and the unconstricted position 38U as shown in FIGS. 3 and 4 illustratively causes the forward end 48 of each of the forward adjustment flaps 40 to slide relative to the inner duct 30. Specifically, movement of the aft adjustment flaps 38 between the constricted and unconstricted positions 38C, 38U causes the forward end 48 of each of the forward adjustment flaps 40 to slide relative to the inner duct 30 between an aft position 48A and a forward position 48F as indicated by arrow 49. When the aft adjustment flaps 38 are in the constricted position 38C shown in FIG. 3, the forward end 48 of each of the forward adjustment flaps 40 is in the aft position 48A. When the aft adjustment flaps 38 are in the unconstricted position 38U shown in FIG. 4, the forward end 48 of each of the forward adjustment flaps 40 is in the forward position 48F. The forward position 48F is forward of the aft position 48A along the central axis 22.

Figure 5:
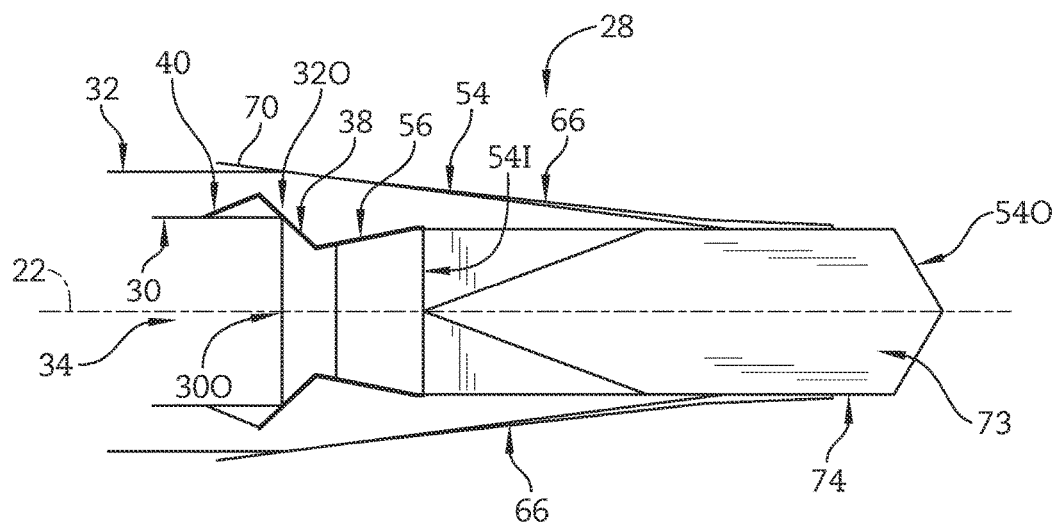
FIG. 5 is a top cross-sectional view of the exhaust system of FIG. 2.
Figure 6:
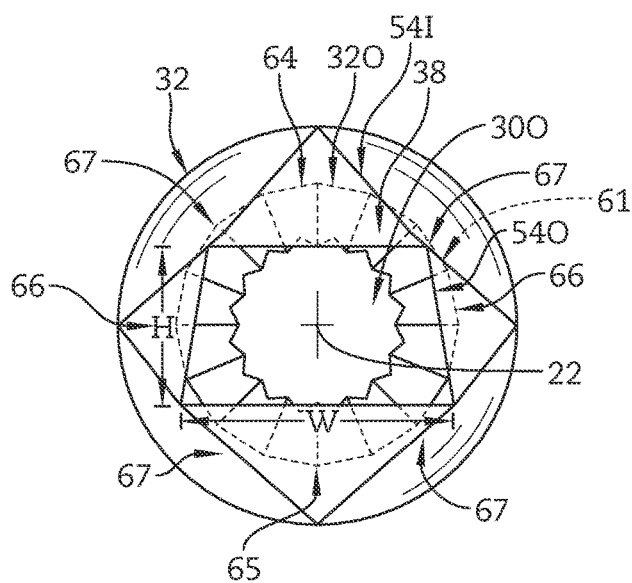
FIG. 6 is an end elevation view of the exhaust system of FIG. 2.

Referring now to FIGS. 5 and 6, the inner duct 30 illustratively terminates at an inner duct outlet 30O that has a substantially circular cross section. The outer duct 32 terminates at an outer duct outlet 32O that also has a substantially circular cross section. The inner duct 30 is shaped to conduct the first and second streams of pressurized air 20, 24 substantially axisymmetrically relative to the central axis 22 to the inner duct outlet 30O. The outer duct 32 is also shaped to conduct the third stream of pressurized air 26 substantially axisymmetrically relative to the central axis 22 to the outer duct outlet 32O.

The exhaust system 28 illustratively includes a divergent section 54 coupled to the outer duct 32 at the outer duct outlet 32O and to the inner duct 30 at the inner duct outlet 30O as shown in FIG. 5. The divergent section 54 is arranged to extend away from the outer duct 32 toward the central axis 22. The divergent section 54 is arranged to receive the first and second streams of pressurized air 20, 24 from the inner passageway 34 and the third stream of pressurized air 26 from the outer passageway 36.

The divergent section 54 illustratively includes a divergent section inlet 54I and a fixed exit area 54O positioned aft of the divergent section inlet 54I along the central axis 22 as shown in FIG. 5. The divergent section inlet 54I is fluidly coupled to the inner duct outlet 30O and the outer duct outlet 32O to receive the first, second, and third streams of pressurized air 20, 24, 26. The exit area 54O is fluidly coupled to the divergent section inlet 54I to discharge the first, second, and third streams of pressurized air 20, 24, 26 received by the divergent section inlet 54I to the atmosphere to provide thrust.

The divergent section inlet 54I illustratively has a first substantially quadrilateral cross section as best seen in FIG. 6. The exit area 54O has a second substantially quadrilateral cross section. The first and second substantially quadrilateral cross sections are different from one another. Specifically, the divergent section inlet 54I has a substantially rectangular cross section whereas the exit area 54O has a substantially trapezoidal cross section.

The divergent section 54 is illustratively shaped to alter the flow of the first, second, and third streams of pressurized air 20, 24, 26 conducted substantially axisymmetrically relative to the central axis 22 by the inner and outer duct outlets 30O, 32O to the divergent section inlet 54I as shown in FIGS. 3 and 4. Specifically, the divergent section 54 is shaped to conduct the first, second, and third streams of pressurized air 20, 24, 26 substantially two-dimensionally relative to the central axis 22 from the divergent section inlet 54I to the exit area 54O. In other embodiments, however, the divergent section 54 may be shaped to conduct the first, second, and third streams of pressurized air 20, 24, 26 substantially three-dimensionally relative to the central axis 22 from the divergent section inlet 54I to the exit area 54O.

Referring back to FIGS. 3 and 4, the exhaust system 28 illustratively includes a plurality of divergent flaps 56 coupled to the divergent section 54. The divergent flaps 56 are coupled to the divergent section 54 so that each of the flaps 56 extends aft of one of the inner portions 42 of the aft adjustment flaps 38 away from the central axis 22 from a leading edge 56L to a trailing edge 56T. The inner portions 42 of the aft adjustment flaps 38 and the leading edges 56L of the divergent flaps 56 cooperate to define a third throat T3 that is positioned aft of the first throat T1 along the central axis 22. The divergent section inlet 54I is defined adjacent the trailing edges 56T of the divergent flaps 56.

Movement of the aft adjustment flaps 38 to the constricted position 38C illustratively opens the third throat T3 to allow the third stream of pressurized air 26 to pass more freely to the divergent section 54 as shown in FIG. 3. Movement of the aft adjustment flaps 38 to the unconstricted position 38U closes down the third throat T3 to restrict the third stream of pressurized air 26 from passing to the divergent section 54 as shown in FIG. 4.

The divergent flaps 56 are illustratively mounted to pivot relative to the divergent section 54 between a constricted position 56C shown in FIG. 3 and an unconstricted position 56U shown in FIG. 4. In the constricted position 56C, the divergent flaps 56 close down the third throat T3 to restrict the third stream of pressurized air 26 from passing to the divergent section 54. In the unconstricted position 56U, the divergent flaps 56 open the third throat T3 to allow the third stream of pressurized air 26 to pass more freely to the divergent section 54. Additionally, at least in the unconstricted position 56U, the divergent flaps 56 overlap with the inner portions 42 of the aft adjustment flaps 38 along the central axis 22.

The exhaust system 28 illustratively includes divergent-flap actuators 58 as shown in FIGS. 3 and 4. One divergent-flap actuator 58 is coupled to each of the divergent flaps 56 to pivot each of the flaps 56 relative to the divergent section 54. In one example, the actuators 58 may be embodied as, or otherwise include, hydraulically-operated actuators such as hydraulic pistons. In another example, the actuators 58 may be embodied as, or otherwise include, electrically-powered actuators such as electrically-powered linear actuators.

A number of features of the illustrative exhaust system 28 may be configured for installation not only in the aircraft 10, but in any of a plurality of aircraft similar to or different from the aircraft 10. For example, the inner duct 30, the outer duct 32, the aft adjustment flaps 38, and the forward adjustment flaps 40 may be configured for installation in any of the plurality of aircraft.

A number of features of the illustrative exhaust system 28 may be configured for installation only in the aircraft 10 and not in any of the plurality of the aircraft similar to or different from the aircraft 10. As such, the features of the exhaust system 28 that may be configured for installation only in the aircraft 10 may be said to be customized to the aircraft 10 or to features of the aircraft 10, such as an airframe 60 or a nacelle 62 of the aircraft 10. For example, the divergent section 54 may be customized to the aircraft 10. Features of the divergent section 54 that may be customized to the aircraft 10 are described in greater detail below.

The divergent section 54 illustratively is 2-D and includes exterior surfaces 64, 65, 66, 67 that are coupled to one another as shown in FIGS. 3-5. The surfaces 64, 65, 66, 67 may be customized to the nacelle 62 of the aircraft 10. For example, the surfaces 64, 65, 66, 67 may be arranged along a divergent section mold line 70 such that the surfaces 64, 65, 66, 67 interface with an exterior boattail surface 72 of the nacelle 62 to form an aerodynamically smooth contour.

The divergent section 54 further illustratively includes exterior surfaces 73, 74 that are coupled to one another as shown in FIGS. 3-5. The surfaces 73, 74 may be customized to the nacelle 62 of the aircraft 10. For example, the surfaces 73, 74 may interface with the exterior boattail surface 72 to form an aerodynamically smooth contour.

The exit area 54O (sometimes referred to as A9) may be customized to the aircraft 10. In one example, the exit area 54O may interface with the exterior boattail surface 72 of the nacelle 62 to form an aerodynamically smooth contour. In another example, the exit area 54O may be sized to provide an aspect ratio (i.e., a ratio of a width W of the outlet 54O to a height H of the outlet 54O) customized to the aircraft 10.

Referring again to FIG. 3, the exhaust system 28 will be described with reference to the operation of the engine 12. At an operating point 80 corresponding to the high-power acceleration mode of the engine 12, the aft adjustment flaps 38 are in the constricted position 38C and the forward ends 48 of the forward adjustment flaps 40 are in the aft position 48A. Additionally, at the operating point 80, the divergent flaps 56 are in the constricted position 56C.

In the constricted position 38C of the aft adjustment flaps 38, the throat T1 is closed down to restrict the third stream of pressurized air 26 from passing through the outer passageway 36 as shown in FIG. 3. In the constricted position 56C of the divergent flaps 56, the throat T3 is closed down to restrict the third stream of pressurized air 26 from passing to the divergent section 54.

During the high-power acceleration mode represented by the operating point 80, the exhaust system 28 restricts the third stream of pressurized air 26 from passing around the engine core 18. As a result, increased thrust may be provided by the engine core 18 during the operating point 80. In other embodiments, however, the operating point 80 may represent a different operating point of the engine 12.

Referring again to FIG. 4, the exhaust system 28 will again be described with reference to the operation of the engine 12. At an operating point 82 corresponding to the low-power cruise mode of the engine 12, the aft adjustment flaps 38 are in the unconstricted position 38U and the forward ends 48 of the forward adjustment flaps 40 are in the forward position 48F. Additionally, at the operating point 82, the divergent flaps 56 are in the unconstricted position 56U.

In the unconstricted position 38U of the aft adjustment flaps 38, the throat T1 is opened to allow the third stream of pressurized air 26 to pass more freely through the outer passageway 36 as shown in FIG. 4. In the unconstricted position 56U of the divergent flaps 56, the throat T3 is opened to allow the third stream of pressurized air 26 to pass more freely to the divergent section 54.

During the low-power cruise mode represented by the operating point 82, the exhaust system 28 allows the third stream of pressurized air 26 to pass more freely around the engine core 18. As a result, less thrust may be provided by the engine core 18 during the operating point 82 than is provided by the engine core 18 during the operating point 80. In other embodiments, however, the operating point 82 may represent a different operating point of the engine 12.

Referring now to FIGS. 7-10, another exhaust system (or nozzle) 128 is shown. The exhaust system 128 is substantially similar to the exhaust system 28. The exhaust system 128 is adapted for use in the gas turbine engine 12 in place of the exhaust system 28, and as such, the exhaust system 128 is adapted for use in the aircraft 10. As such, the exhaust system 128 is described below with reference to the first stream of pressurized air 20 discharged from the engine core 18 and the second and third streams of pressurized air 24, 26 discharged from the fan 16 and passed around the engine core 18.

The exhaust system 128 is configured to adjust the flows of the first, second, and third streams of pressurized air 20, 24, 26 as they are discharged from the engine core 18 and the fan 16. By adjusting the streams of pressurized air, the exhaust system 128 can contribute to performance control of the gas turbine engine 12. Particularly, the exhaust system 128 can be set to a high-power acceleration mode as shown in FIG. 7 or a low-power cruise mode as shown in FIG. 8.

Figure 7:
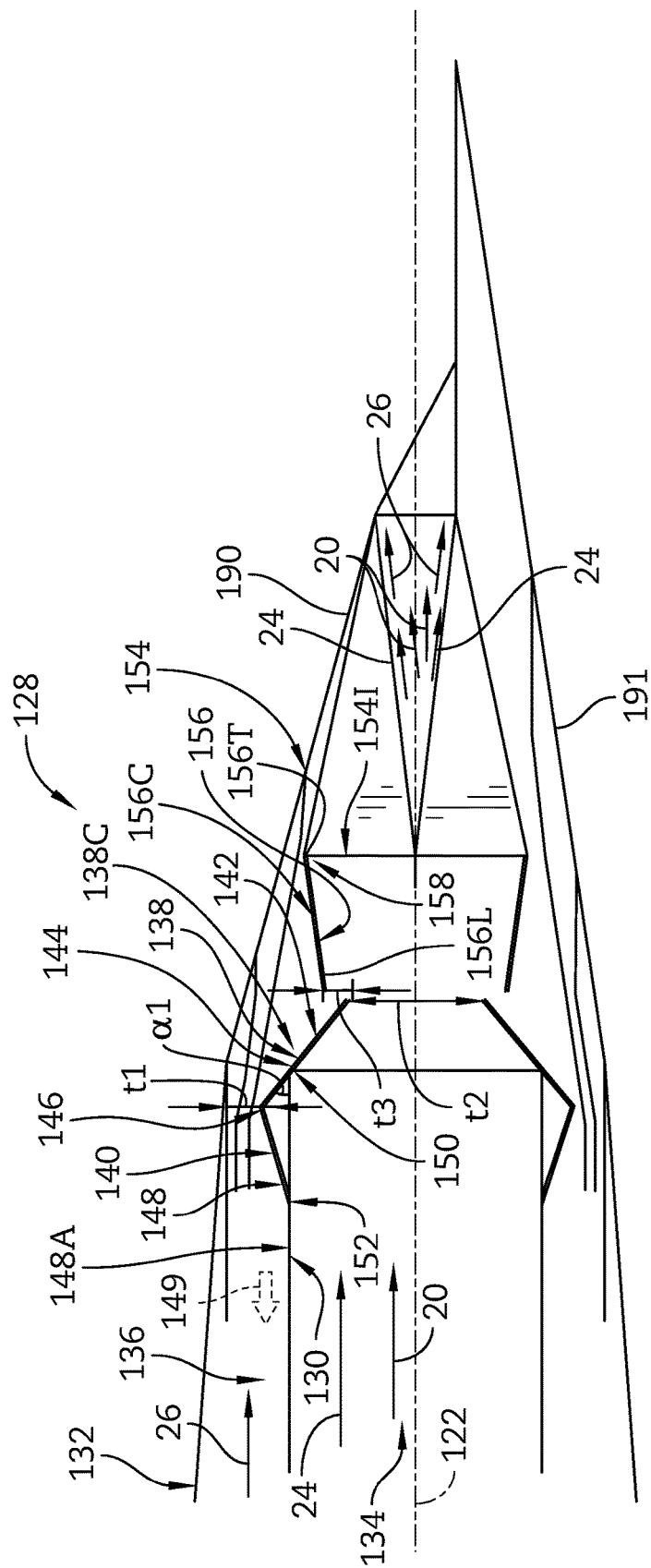
FIG. 7 is a side cross-sectional view of another exhaust system adapted for use in one of the gas turbine engines of FIG. 1 showing forward adjustment flaps, aft adjustment flaps, and divergent flaps of the another exhaust system at one operating point of the one of the gas turbine engines.
Figure 8:
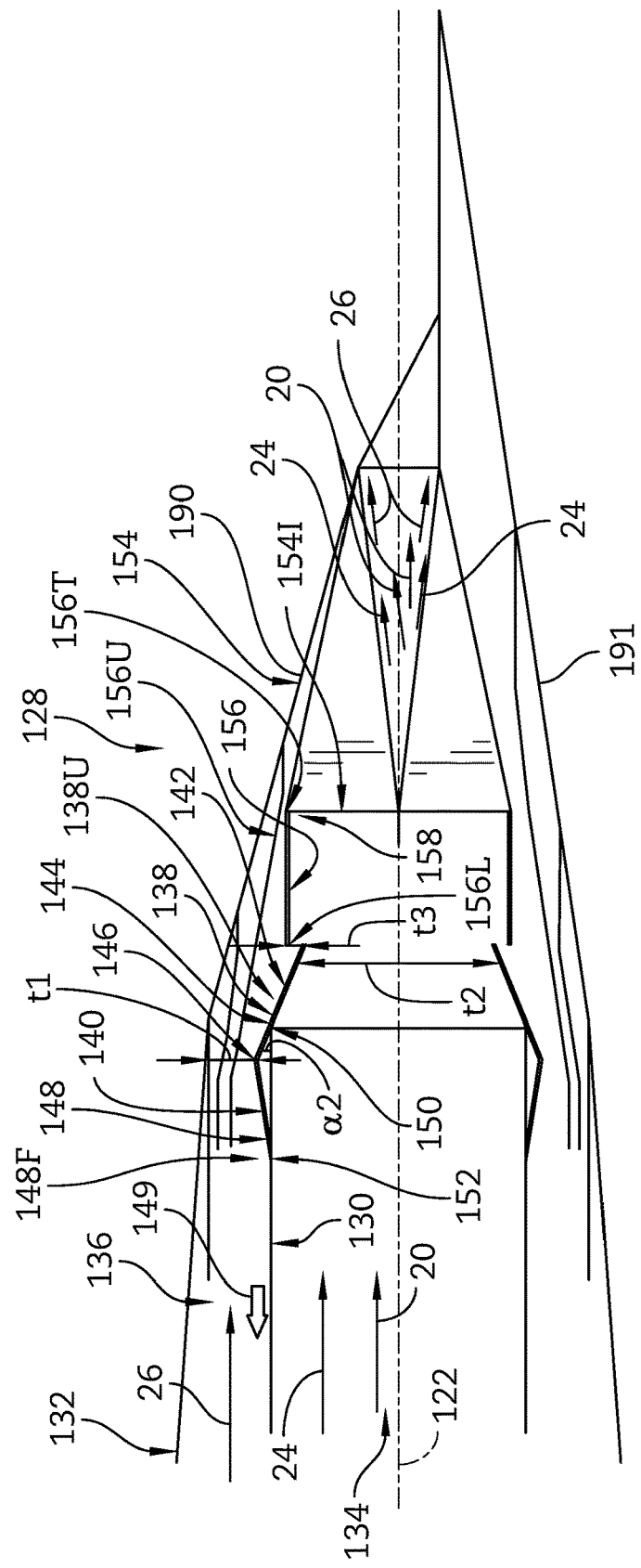
FIG. 8 is a side cross-sectional view similar to FIG. 7 showing the forward adjustment flaps, the aft adjustment flaps, and the divergent flaps of the another exhaust system at another operating point of the one of the gas turbine engines.

The exhaust system 128 illustratively includes an inner duct 130 and an outer duct 132 as shown in FIGS. 7 and 8. The inner duct 130 is arranged around a central axis 122 to define an inner passageway 134 that is arranged to receive the first and second streams of pressurized air 20, 24. The outer duct 132 is arranged radially outward of the inner duct 130 around the central axis 122 so that the inner and outer ducts 130, 132 cooperate to define an outer passageway 136 that is arranged to receive the third stream of pressurized air 26.

The exhaust system 128 further illustratively includes a plurality of aft adjustment flaps 138 and a plurality of forward adjustment flaps 140 as shown in FIGS. 7 and 8. The aft adjustment flaps 138 are mounted to pivot relative to the inner duct 130. Each of the aft adjustment flaps 138 has an inner portion 142 that extends radially inward from the inner duct 130 toward the central axis 122 and an outer portion 144 that extends radially outward from the inner duct 130 away from the central axis 122. The forward adjustment flaps 140 are positioned forward of the aft adjustment flaps 138 along the central axis 122. Each of the forward adjustment flaps 140 has an aft end 146 that is pivotally coupled to the outer portion 144 of the corresponding aft adjustment flap 138 and a forward end 148 that is mounted to the inner duct 130 to slide relative to the inner duct 130.

In the illustrative embodiment, the aft adjustment flaps 138 are mounted to pivot relative to the inner duct 130 between a constricted position 138C shown in FIG. 7 and an unconstricted position 138U shown in FIG. 8. In the constricted position 138C, the aft adjustment flaps 138 close down a throat t1 defined between the outer portions 144 of the flaps 138 and the outer duct 132 to restrict the third stream of pressurized air 26 from passing through the outer passageway 136. In the unconstricted position 138U, the aft adjustment flaps 138 open the throat t1 to allow the third stream of pressurized air 26 to pass more freely through the outer passageway 136.

The exhaust system 128 illustratively includes aft-adjustment-flap actuators 150 and forward-adjustment-flap actuators 152 as shown in FIGS. 7 and 8. One aft-adjustment-flap actuator 150 is coupled to each of the aft adjustment flaps 138 to pivot each of the flaps 138 relative to the inner duct 130. One forward-adjustment-flap actuator 152 is coupled to each of the forward adjustment flaps 140 to slide the forward end 148 of each of the flaps 140 relative to the inner duct 130. In one example, the actuators 150, 152 may be embodied as, or otherwise include, hydraulically-operated actuators such as hydraulic pistons. In another example, the actuators 150, 152 may be embodied as, or otherwise include, electrically-powered actuators such as electrically-powered linear actuators.

Movement of the aft adjustment flaps 138 between the constricted position 138C and the unconstricted position 138U as shown in FIGS. 7 and 8 illustratively adjusts a throat t2 defined between the inner portions 142 of the aft adjustment flaps 138. The throat t2 is located aft and radially inward of the throat t1 relative to the central axis 122. When the aft adjustment flaps 138 are in the constricted position 138C, the flaps 138 close down the throat t2 to restrict the first and second streams of pressurized air 20, 24 from passing through the inner passageway 134. When the aft adjustment flaps 138 are in the unconstricted position 138U, the flaps 138 open the throat t2 to allow the first and second streams of pressurized air 20, 24 to pass more freely through the inner passageway 134.

When the aft adjustment flaps 138 are in the constricted position 138C shown in FIG. 7, an angle $\alpha 1$ is defined between the inner duct 130 and each of the outer portions 144 of the aft adjustment flaps 138. When the aft adjustment flaps 138 are in the unconstricted position 138U shown in FIG. 8, an angle $\alpha 2$ is defined between the inner duct 130 and each of the outer portions 144 of the aft adjustment flaps 138. The angle $\alpha 2$ is illustratively less than the angle $\alpha 1$.

Movement of the aft adjustment flaps 138 between the constricted position 138C and the unconstricted position 138U as shown in FIGS. 7 and 8 illustratively causes the forward end 148 of each of the forward adjustment flaps 140 to slide relative to the inner duct 130. Specifically, movement of the aft adjustment flaps 138 between the constricted and unconstricted positions 138C, 138U causes the forward end 148 of each of the forward adjustment flaps 140 to slide relative to the inner duct 130 between an aft position 148A and a forward position 148F as indicated by arrow 149. When the aft adjustment flaps 138 are in the constricted position 138C shown in FIG. 7, the forward end 148 of each of the forward adjustment flaps 140 is in the aft position 148A. When the aft adjustment flaps 138 are in the unconstricted position 138U shown in FIG. 8, the forward end 148 of each of the forward adjustment flaps 140 is in the forward position 148F. The forward position 148F is forward of the aft position 148A along the central axis 122.

Figure 9:
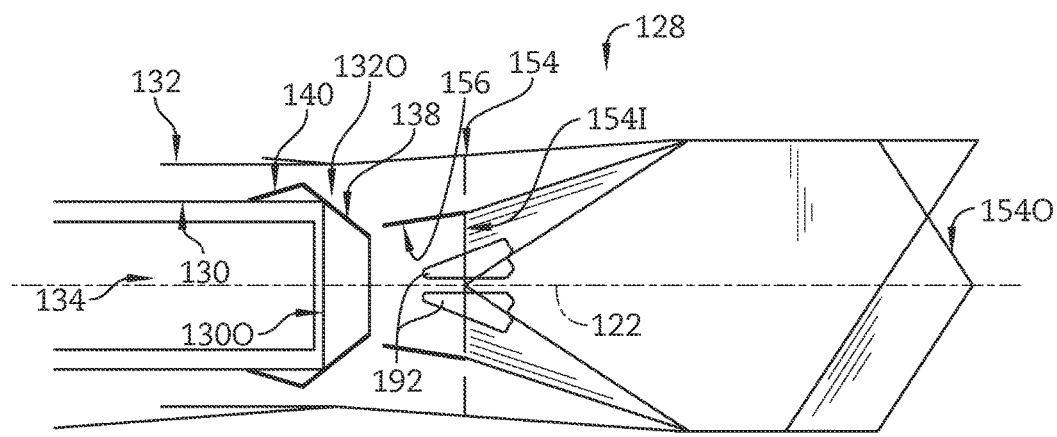
FIG. 9 is a top cross-sectional view of the exhaust system of FIGS. 7 and 8.
Figure 10:
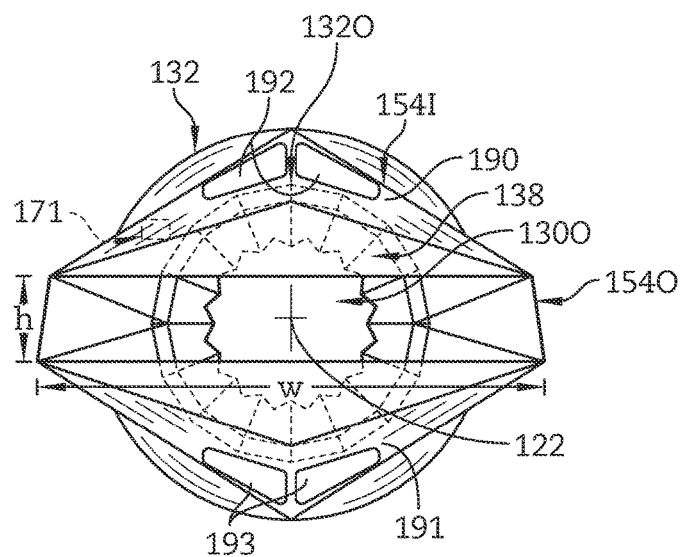
FIG. 10 is an end elevation view of the exhaust system of FIGS. 7 and 8.

Referring now to FIGS. 9 and 10, the inner duct 130 illustratively terminates at an inner duct outlet 130O that has a substantially circular cross section. The outer duct 132 terminates at an outer duct outlet 132O that also has a substantially circular cross section. The inner duct 130 is shaped to conduct the first and second streams of pressurized air 20, 24 substantially axisymmetrically relative to the central axis 122 to the inner duct outlet 130O. The outer duct 132 is also shaped to conduct the third stream of pressurized air 26 substantially axisymmetrically relative to the central axis 122 to the outer duct outlet 132O.

The exhaust system 128 illustratively includes a divergent section 154 coupled to the outer duct 132 at the outer duct outlet 132O and to the inner duct 130 at the inner duct outlet 130O as shown in FIG. 9. The divergent section 154 is arranged to extend away from the outer duct 132 toward the central axis 122. The divergent section 154 is arranged to receive the first and second streams of pressurized air 20, 24 from the inner passageway 134 and the third stream of pressurized air 26 from the outer passageway 136.

The divergent section 154 illustratively includes a divergent section inlet 154I and a fixed exit area 154O positioned aft of the divergent section inlet 154I along the central axis 122 as shown in FIG. 9. The divergent section inlet 154I is fluidly coupled to the inner duct outlet 130O and the outer duct outlet 132O to receive the first, second, and third streams of pressurized air 20, 24, 26. The exit area 154O is fluidly coupled to the divergent section inlet 154I to discharge the first, second, and third streams of pressurized air 20, 24, 26 received by the divergent section inlet 154I to the atmosphere to provide thrust.

The divergent section inlet 154I illustratively has a first cross section as best seen in FIG. 10. The exit area 154O has a second cross section. The first and second cross sections are different from one another. The exit area 154O has a substantially trapezoidal cross section.

The divergent section 154 is illustratively shaped to alter the flow of the first, second, and third streams of pressurized air 20, 24, 26 conducted substantially axisymmetrically relative to the central axis 122 by the inner and outer duct outlets 130O, 132O to the divergent section inlet 154I as shown in FIGS. 7 and 8. Specifically, the divergent section 154 is shaped to conduct the first, second, and third streams of pressurized air 20, 24, 26 substantially two-dimensionally relative to the central axis 122 from the divergent section inlet 154I to the exit area 154O. In other embodiments, however, the divergent section 154 may be shaped to conduct the first, second, and third streams of pressurized air 20, 24, 26 substantially three-dimensionally relative to the central axis 122 from the divergent section inlet 154I to the exit area 154O.

Referring back to FIGS. 7 and 8, the exhaust system 128 illustratively includes a plurality of divergent flaps 156 coupled to the divergent section 154. The divergent flaps 156 are coupled to the divergent section 154 so that each of the flaps 156 extends aft of one of the inner portions 142 of the aft adjustment flaps 138 away from the central axis 122 from a leading edge 156L to a trailing edge 156T. The inner portions 142 of the aft adjustment flaps 138 and the leading edges 156L of the divergent flaps 156 cooperate to define a third throat t3 that is positioned aft of the first throat t1 along the central axis 122. The divergent section inlet 154I is defined adjacent the trailing edges 156T of the divergent flaps 156.

Movement of the aft adjustment flaps 138 to the constricted position 138C illustratively opens the third throat t3 to allow the third stream of pressurized air 26 to pass more freely to the divergent section 154 as shown in FIG. 7. Movement of the aft adjustment flaps 138 to the unconstricted position 138U closes down the third throat t3 to restrict the third stream of pressurized air 26 from passing to the divergent section 154 as shown in FIG. 8.

The divergent flaps 156 are illustratively mounted to pivot relative to the divergent section 154 between a constricted position 156C shown in FIG. 7 and an unconstricted position 156U shown in FIG. 8. In the constricted position 156C, the divergent flaps 156 close down the third throat t3 to restrict the third stream of pressurized air 26 from passing to the divergent section 154. In the unconstricted position 156U, the divergent flaps 156 open the third throat t3 to allow the third stream of pressurized air 26 to pass more freely to the divergent section 154. Additionally, at least in the unconstricted position 156U, the divergent flaps 156 overlap with the inner portions 142 of the aft adjustment flaps 138 along the central axis 122.

The exhaust system 128 illustratively includes divergent-flap actuators 158 as shown in FIGS. 7 and 8. One divergent-flap actuator 158 is coupled to each of the divergent flaps 156 to pivot each of the flaps 156 relative to the divergent section 154. In one example, the actuators 158 may be embodied as, or otherwise include, hydraulically-operated actuators such as hydraulic pistons. In another example, the actuators 158 may be embodied as, or otherwise include, electrically-powered actuators such as electrically-powered linear actuators.

A number of features of the illustrative exhaust system 128 may be configured for installation not only in the aircraft 10, but in any of a plurality of aircraft similar to or different from the aircraft 10. For example, the inner duct 130, the outer duct 132, the aft adjustment flaps 138, and the forward adjustment flaps 140 may be configured for installation in any of the plurality of aircraft.

A number of features of the illustrative exhaust system 128 may be configured for installation only in the aircraft 10 and not in any of the plurality of the aircraft similar to or different from the aircraft 10. As such, the features of the exhaust system 128 that may be configured for installation only in the aircraft 10 may be said to be customized to the aircraft 10. For instance, the divergent section 154 may be customized to the aircraft 10. Features of the divergent section 154 that may be customized to the aircraft 10 are described in greater detail below.

The exit area 154O may be customized to the aircraft 10. The exit area 154O may be sized to provide an aspect ratio (i.e., a ratio of a width w of the outlet 154O to a height h of the outlet 154O) customized to the aircraft 10. The aspect ratio provided by the exit area 154O may be greater than the aspect ratio provided by the exit area 54O as best seen in FIG. 10.

The divergent section 154 further illustratively includes exterior surfaces 190, 191 that are coupled to one another as shown in FIGS. 7-9. The surfaces 190, 191 may be customized to the aircraft 10. For example, the surfaces 190, 191 may be customized to accommodate a heat exchanger and conduits associated therewith that are included in the aircraft 10. A pair of apertures 192 may be formed in the surface 190, and a pair of apertures 193 may be formed in the surface 191 as best seen in FIG. 10.

The present disclosure provides a convergent-divergent exhaust nozzle (e.g., the nozzle 28) for an aircraft (e.g., the aircraft 10) which may be referred to as a single expansion ramp nozzle. The nozzle may be adapted for use in a variable cycle turbofan engine (e.g., the gas turbine engine 12). The nozzle may incorporate a fixed nozzle exit area aperture (e.g., exit area 54O) and independently variable throat areas (e.g., the throats T1-T3) for the engine core and bypass exhaust streams (e.g., the first and second streams of pressurized air 20, 24) and for the additional lower pressure bypass exhaust stream (e.g., the third stream of pressurized air 26).

The nozzle may include an axisymmetric convergent nozzle assembly (e.g., the forward adjustment flaps 38) that may be attached to an end of a pipe (e.g., the inner duct 30) adapted to receive high-temperature pressurized air discharged from an afterburner (e.g., the afterburner 31). The convergent nozzle assembly may use actuators (e.g., actuators 50, 52), a translating unison ring, and cam tracks to vary a primary throat area (e.g., the throat T2). The convergent nozzle assembly may be designed in concert with an axisymmetric variable area assembly which may be part of a divergent nozzle assembly (e.g., the divergent flaps 56). The divergent nozzle assembly may overlap the end of the convergent nozzle assembly in a manner that forms an annular throat (e.g., the throat T3) that may be independently varied with respect to the primary throat area using an actuator mechanism (e.g., actuators 58) similar to that used for the convergent nozzle assembly.

The downstream end of the divergent nozzle assembly may be attached to a forward end of an exhaust divergent section (e.g., the divergent section 54). The exhaust divergent section may transition the engine core and bypass exhaust streams and the lower pressure bypass exhaust stream from axisymmetric at the beginning of the transition (e.g., the divergent section inlet 54I) to two-dimensional at the fixed nozzle exit area aperture.

The exhaust divergent section may include flat facets (e.g., the surfaces 64, 65, 66), curved sections (e.g., the surface 67), the fixed nozzle exit area aperture, nozzle sidewalls (e.g., the surface 73), and a lower deck surface (e.g., the surface 74). The exhaust divergent section may include an outer nacelle transition 11 and an inner nacelle transition 13 that transforms external nozzle boattail mold-line surfaces of the nozzle from axisymmetric to two-dimensional such that an upstream boattail mold-line (e.g., a mold line defined by the exterior boattail surface 72 of the nacelle 62) blends with an axisymmetric aircraft aft-body mold-line (e.g., the divergent section mold line 70) and a downstream boattail mold-line (e.g., a mold line defined by the exterior boattail surface 74 of the nacelle 62) blends with the fixed nozzle exit area aperture, the nozzle sidewalls, and the lower deck surface.

The convergent nozzle assembly flowpath may be designed for use with the engine core and bypass exhaust streams. The exhaust divergent section and the downstream 2-D nozzle flowpath may be designed for use with the combined engine core and bypass exhaust streams and the lower pressure bypass exhaust stream. The surface shaping and aspect ratio of the exhaust divergent section (e.g., the aspect ratio of the exit area 54O) and the 2-D flowpath, and the outer nacelle transition and 2-D flowpath, may be designed to aerodynamically and mechanically blend with the aircraft fuselage/nacelle/aft-body, wing and empennage surfaces to enhance survivability of the air vehicle and share common structure between the exhaust nozzle and surrounding airframe (e.g., the airframe 60) where advantageous to do so.

The fixed 2-D flowpath, the outer nacelle transition, and the shaping and aspect ratio of the fixed nozzle exit area aperture (e.g., the divergent section 54) may be integrated with the airframe specific to each installation. The fixed nozzle exit area aperture may also be 3-D depending on the aircraft integration requirements.

The entire fixed geometry 2-D divergent section of the nozzle may be mounted to the airframe (e.g., the airframe 60) with a flexible metallic gas path seal (e.g., a seal 61) such that nozzle loads may be transmitted into the aft aircraft structure and not cantilevered from the engine augmentor case. The aircraft installation may be a single-engine "isolated nacelle" installation or a multi-engine installation. In a multi-engine installation, the nozzle may blend with the interfacing aircraft surfaces (e.g., the surface 72) and the engine core (i.e., the engine core 18) for enhanced survivability. The disclosed design may be advantageous in that the nozzle may utilize a maximum amount of the axisymmetric flowpath for the "high" pressure, variable area section of the nozzle and a minimum amount of the 2-D flowpath for the "low" pressure, fixed area section of the nozzle.

The use of the axisymmetric, hoop-stressed, flap-seal structure for the "high" static wall pressure convergent section of the nozzle, which includes the variable throat area convergent nozzle and a small portion of the initial divergent section, in concert with the fixed geometry 2-D nozzle structure for the "low" static wall pressure divergent section of the nozzle may result in a lower overall weight nozzle design compared to an all 2-D nozzle construction. The customized design of the nozzle 2-D internal and external flowpath and mechanical construction including nozzle exit area aperture shaping, aspect ratio, boattail surface contouring, etc. to "match" each aircraft installation may provide optimal survivability features, low system weight, integrated shared nozzle-airframe structures, and lower development and production costs. The structural and aerodynamic integration of the 2-D divergent portion of the nozzle into the aft airframe structure to efficiently transmit the divergent nozzle loads directly into the airframe "shared structure," as opposed to transmitting the nozzle loads back into the aft engine flanges and cases and thereby necessitating a heavier engine structure as a result, may provide another advantage of the disclosed design.

The disclosed design may utilize an outer, variable-flap seal design, initial divergent section (basically a larger diameter variable area convergent nozzle assembly turned 180 degrees on its centerline such that the smaller diameter variable area plane is facing upstream) that may be designed in concert with the smaller diameter variable convergent nozzle to form a variable $3^{rd}$ stream annular throat area that is independently variable with respect to the variable primary nozzle throat area, similar to an ejector nozzle, except with independently variable annulus area ($3^{rd}$ stream throat area).

A different embodiment of the nozzle configuration (e.g., the nozzle 128) may have a fixed nozzle exit aperture area that is distributed over a higher aspect ratio (e.g., the aspect ratio of the exit area 154O) to conform to specific aircraft integration requirements and provide space for heat exchanger (e.g., a heat exchanger 171) exhaust ducting in the upper and lower boattail surfaces (e.g., the surfaces 190, 191). A preferred trailing edge alignment may be applied to the aft facing convergent nozzle flap-seal segments. A plurality of fixed nozzle exit aperture area aspect ratios between the "low" aspect ratio configuration (e.g., the aspect ratio of the transition outlet duct 54O) and the "high" aspect ratio configuration (e.g., the aspect ratio of the transition outlet duct 154O) may be achieved depending on the aircraft integration requirements. Regardless of the aircraft integration requirements, a common axisymmetric design of the "high pressure" nozzle convergent section and divergent section may be used with an aircraft-specific 2-D section.

Maximum use of axisymmetric variable-area design technology for the convergent section of the nozzle, as well as throat area variation for both the engine core and bypass streams and the lower pressure bypass stream, may reduce overall nozzle weight, development costs, and schedules. Design commonality for each engine-airframe installation, in concert with minimum use of fixed geometry 2-D nozzle construction for the divergent portion of the nozzle that is installation-specific, may maximize air vehicle survivability and minimize nozzle system weight and development costs.

The embodiments of the nozzle (e.g., the nozzles 28, 128) disclosed herein may utilize a combination of both axisymmetric and 2-D flowpaths and construction techniques as opposed to utilizing all 2-D flowpaths and construction. Because the disclosed embodiments of the nozzle may be of lighter weight and less surface area than other 2-D nozzle configurations having the same throat and exit area requirements, the disclosed nozzles may require less cooling. A small reduction in nozzle thrust coefficients may be experienced for the disclosed nozzles as a result of the internal flowpath transition from axisymmetric to 2-D which takes places downstream of the engine core and bypass exhaust streams and the lower pressure bypass stream. The reduction in nozzle weight and cooling as compared to most 2-D nozzle configurations, however, may offset any loss of performance resulting from the small reduction is nozzle thrust coefficients.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
an engine core configured to discharge a first stream of pressurized air that is passed through the engine core along a central axis,
a fan coupled to the engine core to be driven by the engine core, the fan configured to discharge a second stream of pressurized air and a third stream of pressurized air that are passed around the engine core, and
an exhaust system coupled to the engine core, the exhaust system including (i) an inner duct arranged around the central axis to define an inner passageway arranged to receive the first stream and the second stream of pressurized air, (ii) an outer duct arranged radially outward of the inner duct around the central axis so that the inner duct and the outer duct cooperate to define an outer passageway arranged to receive the third stream of pressurized air, (iii) a plurality of aft adjustment flaps mounted to pivot relative to the inner duct, each of the aft adjustment flaps having an inner portion extending radially inward from the inner duct toward the central axis and an outer portion extending radially outward from the inner duct away from the central axis, and (iv) a plurality of forward adjustment flaps, each of the forward adjustment flaps having an aft end pivotally coupled to the outer portion of a corresponding aft adjustment flap and a forward end mounted to the inner duct to slide relative to the inner duct.

2. The gas turbine engine of claim 1, wherein (i) the aft adjustment flaps are mounted to pivot relative to the inner duct between a constricted position in which the aft adjustment flaps close down a first throat defined between the outer portions of the aft adjustment flaps and the outer duct to restrict the third stream of pressurized air from passing through the outer passageway and an unconstricted position in which the aft adjustment flaps open the first throat to allow the third stream of pressurized air to pass more freely through the outer passageway, (ii) the aft adjustment flaps close down a second throat defined between the inner portions of the aft adjustment flaps to restrict the first and second streams of pressurized air from passing through the inner passageway when the aft adjustment flaps are in the constricted position, and (iii) the aft adjustment flaps open the second throat to allow the first and second streams of pressurized air to pass more freely through the inner passageway when the aft adjustment flaps are in the unconstricted position.

3. The gas turbine engine of claim 2, wherein a first angle is defined between the inner duct and the outer portions of the aft adjustment flaps when the aft adjustment flaps are in the constricted position and a second angle is defined between the inner duct and the outer portions of the aft adjustment flaps when the aft adjustment flaps are in the unconstricted position that is less than the first angle.

4. The gas turbine of claim 2, wherein movement of the aft adjustment flaps between the constricted position and the unconstricted position causes the forward ends of the forward adjustment flaps to slide relative to the inner duct between (i) an aft position along the central axis and (ii) a forward position along the central axis that is forward of the aft position.

5. The gas turbine engine of claim 2, wherein (i) the exhaust system further comprises a divergent section coupled to the outer duct and arranged to extend away from the outer duct toward the central axis and a plurality of divergent flaps coupled to the divergent section so that the divergent flaps extend aft of the inner portions of the aft adjustment flaps away from the central axis and (ii) the inner portions of the aft adjustment flaps and the divergent flaps cooperate to define a third throat that is positioned aft of the first throat along the central axis.

6. The gas turbine engine of claim 5, wherein (i) movement of the aft adjustment flaps to the unconstricted position closes down the third throat to restrict the third stream of pressurized air from passing to the divergent section and (ii) movement of the aft adjustment flaps to the constricted position opens the third throat to allow the third stream of pressurized air to pass more freely to the divergent section.

7. The gas turbine engine of claim 6, wherein the divergent flaps are mounted to pivot relative to the divergent section between (i) a constricted position in which the divergent flaps close down the third throat to restrict the third stream of pressurized air from passing to the divergent section and (ii) an unconstricted position in which the divergent flaps open the third throat to allow the third stream of pressurized air to pass more freely to the divergent section.

8. The gas turbine engine of claim 5, wherein (i) the outer duct terminates at an outer duct outlet having a substantially circular cross section and (ii) the divergent section includes a divergent section inlet fluidly coupled to the outer duct outlet that has a first substantially quadrilateral cross section.

9. The gas turbine engine of claim 8, wherein the divergent section terminates at a exit area positioned aft of the divergent section inlet along the central axis that has a second substantially quadrilateral cross section different from the first substantially quadrilateral cross section.

10. The gas turbine engine of claim 9, wherein (i) the outer and inner ducts are shaped to conduct the first, second, and third streams of pressurized air substantially axisymmetrically relative to the central axis to the divergent section inlet and (ii) the divergent section is shaped to conduct the first, second, and third streams of pressurized air substantially two-dimensionally relative to the central axis from the divergent section inlet to the exit area.

11. An exhaust system for a gas turbine engine, the exhaust system comprising
    a inner duct arranged around a central axis of the gas turbine engine, the inner duct defining an inner passageway arranged to receive a first stream of pressurized air discharged from an engine core of the gas turbine engine and a second stream of pressurized air discharged from a fan of the gas turbine engine and passed around the engine core,
    an outer duct arranged radially outward of the inner duct around the central axis of the gas turbine engine, the outer duct cooperating with the inner duct to define an outer passageway arranged to receive a third stream of pressurized air discharged from the fan of the gas turbine engine and passed around the engine core,
    a plurality of aft adjustment flaps mounted to pivot relative to the inner duct, each of the aft adjustment flaps having an inner portion extending radially inward from the inner duct toward the central axis and an outer portion extending radially outward from the inner duct away from the central axis, and
    a plurality of forward adjustment flaps positioned forward of the aft adjustment flaps along the central axis, each of the forward adjustment flaps having an aft end pivotally coupled to the outer portion of a corresponding aft adjustment flap and a forward end mounted to the inner duct to slide relative to the inner duct.

12. The exhaust system of claim 11, further comprising a divergent section coupled to the outer duct and arranged to extend away from the outer duct toward the central axis and a plurality of divergent flaps coupled to the divergent section so that the divergent flaps extend aft of the inner portions of the aft adjustment flaps away from the central axis, wherein (i) the inner portions of the aft adjustment flaps and the divergent flaps cooperate to define a first throat arranged to receive the third stream of pressurized air and (ii) the inner portions of the aft adjustment flaps define a second throat arranged to receive the first and second streams of pressurized air.

13. The exhaust system of claim 12, wherein the divergent flaps are mounted to pivot relative to the divergent section between (i) a constricted position in which the divergent flaps close down the first throat to restrict the third stream of pressurized air from passing to the divergent section and (ii) an unconstricted position in which the divergent flaps open the first throat to allow the third stream of pressurized air to pass more freely to the divergent section.

14. The exhaust system of claim 12, wherein (i) the outer duct terminates at an outer duct outlet having a substantially circular cross section and (ii) the divergent section includes a divergent section inlet fluidly coupled to the outer duct outlet that has a first substantially quadrilateral cross section.

15. The exhaust system of claim 14, wherein the divergent section terminates at a exit area positioned aft of the divergent section inlet along the central axis that has a second substantially quadrilateral cross section different from the first substantially quadrilateral cross section.

16. The exhaust system of claim 15, wherein (i) the outer and inner ducts are shaped to conduct the first, second, and third streams of pressurized air substantially axisymmetrically relative to the central axis to the divergent section inlet and (ii) the divergent section is shaped to conduct the first, second, and third streams of pressurized air substantially two-dimensionally relative to the central axis from the divergent section inlet to the exit area.

17. The exhaust system of claim 12, wherein (i) the aft adjustment flaps are mounted to pivot relative to the inner duct between a constricted position in which the aft adjustment flaps close down a third throat defined between the outer portions of the aft adjustment flaps and the outer duct and positioned forward of the first throat along the central axis to restrict the third stream of pressurized air from passing through the outer passageway and an unconstricted position in which the aft adjustment flaps open the third throat to allow the third stream of pressurized air to pass more freely through the outer passageway, (ii) the aft adjustment flaps close down the second throat to restrict the first and second streams of pressurized air from passing through the inner passageway when the aft adjustment flaps are in the constricted position, and (iii) the aft adjustment flaps open the second throat to allow the first and second streams of pressurized air to pass more freely through the inner passageway when the aft adjustment flaps are in the unconstricted position.

18. The exhaust system of claim 17, wherein a first angle is defined between the inner duct and the outer portions of the aft adjustment flaps when the aft adjustment flaps are in the constricted position and a second angle is defined between the inner duct and the outer portions of the aft adjustment flaps when the aft adjustment flaps are in the unconstricted position that is less than the first angle.

19. The exhaust system of claim 17, wherein movement of the aft adjustment flaps between the constricted position and the unconstricted position causes the forward ends of the forward adjustment flaps to slide relative to the inner duct between (i) an aft position along the central axis and (ii) a forward position along the central axis that is forward of the aft position.

20. The exhaust system of claim 17, wherein (i) movement of the aft adjustment flaps to the unconstricted position closes down the first throat to restrict the third stream of pressurized air from passing to the divergent section and (ii) movement of the aft adjustment flaps to the constricted position opens the first throat to allow the third stream of pressurized air to pass more freely to the divergent section.

21. An aircraft comprising
an airframe,
a nacelle supported by the airframe, and
a gas turbine engine supported by the airframe and surrounded at least partially by the nacelle, the gas turbine engine including an engine core configured to discharge a first stream of pressurized air that is passed through the engine core along a central axis, a fan coupled to the engine core to be driven by the engine core and configured to discharge a second stream of pressurized air and a third stream of pressurized air that are passed around the engine core, and an exhaust system coupled to the engine core, the exhaust system including (i) an inner duct arranged around the central axis to define an inner passageway arranged to receive the first stream and the second stream of pressurized air, (ii) an outer duct arranged radially outward of the inner duct around the central axis so that the inner duct and the outer duct cooperate to define an outer passageway arranged to receive the third stream of pressurized air, (iii) a plurality of aft adjustment flaps mounted to pivot relative to the inner duct, each of the aft adjustment flaps having an inner portion extending radially inward from the inner duct toward the central axis and an outer portion extending radially outward from the inner duct away from the central axis, and (iv) a plurality of forward adjustment flaps, each of the forward adjustment flaps having an aft end pivotally coupled to the outer portion of a corresponding aft adjustment flap and a forward end mounted to the inner duct to slide relative to the inner duct.

22. The aircraft of claim 21, further comprising a flexible seal, wherein (i) the exhaust system further comprises a divergent section coupled to the outer duct and arranged to extend away from the outer duct toward the central axis and (ii) the divergent section is configured to be mounted to the airframe with the flexible seal.

23. The aircraft of claim 22, wherein the divergent section interfaces with the nacelle to form a smooth contour.

24. The aircraft of claim 23, wherein the divergent section is two-dimensional, is aerodynamically blended with outer surfaces of the aircraft, and is structurally integrated with the airframe to provide reduced system weight and cost.

* * * * *